US010061858B2

(12) United States Patent
Park et al.

(10) Patent No.: US 10,061,858 B2
(45) Date of Patent: Aug. 28, 2018

(54) METHOD AND APPARATUS FOR PROCESSING EXPLODING DATA STREAM

(71) Applicant: Electronics and Telecommunications Research Institute, Daejeon (KR)

(72) Inventors: Choon Seo Park, Daejeon (KR); Jin Hwan Jeong, Seoul (KR); Mi Young Lee, Daejeon (KR); Sung Jin Hur, Daejeon (KR); Myung Cheol Lee, Daejeon (KR); Yong Ju Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 440 days.

(21) Appl. No.: 14/606,084

(22) Filed: Jan. 27, 2015

(65) Prior Publication Data
US 2015/0222696 A1 Aug. 6, 2015

(30) Foreign Application Priority Data

Feb. 5, 2014 (KR) ........................ 10-2014-0013135

(51) Int. Cl.
*G06F 15/16* (2006.01)
*G06F 17/30* (2006.01)
(52) U.S. Cl.
CPC .. *G06F 17/30876* (2013.01); *G06F 17/30516* (2013.01)

(58) Field of Classification Search
CPC ...... H04L 67/10; G06F 17/227; G06F 17/272; G06F 17/30516; G06F 17/30489;
(Continued)

(56) References Cited

U.S. PATENT DOCUMENTS

| 9,298,788 B1* | 3/2016 | Kekre | ............... G06F 17/30569 |
| 2008/0168179 A1* | 7/2008 | Gu | .................... G06F 17/30985 |
| | | | 709/231 |

(Continued)

OTHER PUBLICATIONS

Thusoo et al., "Hive—A Petabyte Scale Data Warehouse Using Hadoop", IEEE 26th International Conference on Data Engineering (ICDE), pp. 996-1005, Mar. 1-6, 2010.
(Continued)

*Primary Examiner* — Farzana Huq
(74) *Attorney, Agent, or Firm* — Rabin & Berdo, P.C.

(57) ABSTRACT

Provided are a method and apparatus for processing a data stream capable of providing a data flow processing language to support real-time processing of an exploding data stream and providing an environment for executing the data flow processing language in a cluster system. The data flow-based exploding data stream processing method includes receiving a big data real-time processing service described in a real-time data flow language, interpreting the big data real-time processing service to generate a distributed stream processing service, and distributively deploying the distributed stream processing service in a cluster system including multiple nodes and configuring an execution environment for executing the distributed stream processing service in each node.

10 Claims, 6 Drawing Sheets

(58) Field of Classification Search
CPC ........... G06F 17/3053; G06F 17/30876; G06F 17/30533; G06F 9/06; G06F 9/5083
USPC ................................ 709/201, 203, 226, 231
See application file for complete search history.

(56) References Cited

U.S. PATENT DOCUMENTS

| | | | |
|---|---|---|---|
| 2010/0250518 A1* | 9/2010 | Bruno | G06F 17/30386 707/718 |
| 2011/0154339 A1 | 6/2011 | Lee et al. | |
| 2012/0072391 A1* | 3/2012 | Simitsis | G06Q 10/103 707/602 |
| 2012/0167103 A1* | 6/2012 | Kim | G06F 9/5027 718/102 |

OTHER PUBLICATIONS

Olston et al., "Pig Latin: A Not-So-Foreign Language for Data Processing", Pro. of the ACM SIGMOD international conference on Management of data, Jun. 2008.

* cited by examiner

METHOD AND APPARATUS FOR PROCESSING EXPLODING DATA STREAM

CROSS-REFERENCE TO RELATED APPLICATIONS

This application claims priority under 35 U.S.C. § 119 to Korean Patent Application No. 10-2014-0013135, filed on Feb. 5, 2014, the disclosure of which is incorporated herein by reference in its entirety.

TECHNICAL FIELD

The present invention relates to a technique of processing an exploding data stream, and more particularly, to a method and apparatus for processing a data stream capable of providing a data flow processing language to support real-time processing of an exploding data stream and providing an environment for executing the data flow processing language in a cluster system.

BACKGROUND

Recently, as various sensing devices, smart sensing networking technologies, and the like, have been actively proposed, an amount of information generated in a ubiquitous computing environment is massive, and a huge amount of information, rather than being limited to such as in previous simple computing devices, are continuously generated at a very high speed. Also, various types of information have also been successively generated massively in the fields of commercial information analysis, Web information or call record log analysis, and the like. In general, a data aggregation in a massive form is called a data stream, which is an unbounded data set that is progressively generated as time goes, and due to the change in the form of generation of information, simple application of an existing data analysis technology for a bounded data set to sensor data processing, or the like, in a ubiquitous computing environment has a limitation. Thus, recently, interest of database research groups has moved to research into various techniques for effectively processing information in the form of a data stream, and various methods for searching for information included in a data stream and various methods for processing a continuous query with respect to a data stream have been actively proposed.

In particular, research into a big data platform technology for processing big data has been extensively conducted. Among big data platforms, Hadoop platform, an open source, is typical. Hadoop MapReduce provides highly scalable distributed data processing function; however, supporting a low level of interface, Hadoop MapReduce is difficult to program. In order to solve such a problem, Hadoop Pig, a data flow processing system, providing a high level of interface has been developed. Hadoop Pig provides a high level of data flow language called Pig Latin, offers convenience and productivity of big data processing service development to users.

However, the Hadoop platform is a batch-based system, so it has a limitation in processing real-time big data. Thus, a highly scalable big data real-time processing technique supporting a high level of data flow language interface, while providing real-time processing of an exploding data stream, is required.

SUMMARY

Accordingly, the present invention provides a method and apparatus for processing a data stream capable of providing a data flow processing language to support real-time processing of an exploding data stream and providing an environment for executing the data flow processing language in a cluster system.

In one general aspect, a data flow-based exploding data stream processing method includes: receiving a big data real-time processing service descried in a real-time data flow language; interpreting the big data real-time processing service to generate a distributed stream processing service; and distributively deploying the distributed stream processing service in a cluster system including multiple nodes and configuring an execution environment for executing the distributed stream processing service in each node.

The generating of a distributed stream processing service may include: configuring a logical plan by interpreting a big data real-time processing service described in a real-time data flow language; and optimizing the logical plan and converting the optimized logical plan into a directed acyclic graph (DAG)-based distributed stream processing service.

The real-time data flow language may include basic operators providing processing regarding a tuple and a tuple aggregation, and field operators providing processing regarding fields forming the tuple.

The configuring of a logical plan may include configuring the basic operators as nodes of the logical plan, expressing relationships between the basic operators as links of the nodes, and setting the field operators to a relationship in which the field operators are dependent upon the basic operators.

The converting into a DAG-based distributed stream processing service may include converting the nodes and the links forming the logical plan into the DAG-based distributed stream processing service by using an application programming interface (API) provided from a distributed processing system.

The configuring of an execution environment may include: distributively deploying tasks forming the distributed stream processing service in a plurality of nodes based on resource conditions of the cluster system.

The distributed stream processing service may include a relationship between external input/output tasks defining a task of receiving a data stream from an external source and providing the received data stream in units of window or a task of outputting a data stream to an external source and stream processing tasks defining a task of receiving and processing a data stream, expressed based on DAG.

The method may further include: collecting state information of nodes forming the cluster system and state information regarding a task of a distributed stream processing service processed in the nodes; and redeploying the distributed stream processing service based on the state information.

In another aspect, a data flow-based exploding data stream processing system includes: a data flow language converting module configured to interpret a big data real-time processing service described in a real-time data flow language and configure a logical plan; a distributed stream service generating module configured to optimize the logical plan and convert the optimized logical plan into a directed acrylic graph (DAG)-based distributed stream processing service; and a distributed stream processing service managing module configured to distributively deploy the distributed stream processing service in a cluster system including multiple nodes and configure an execution environment for executing the distributed stream processing service in each node.

The real-time data flow language may include basic operators providing processing regarding a tuple and a tuple aggregation, and field operators providing processing regarding fields forming the tuple.

The data flow language converting module may configure the basic operators as nodes of the logical plan, express relationships between the basic operators as links of the nodes, and set the field operators to a relationship in which the field operators are dependent upon the basic operators.

The distributed stream service generating module may convert the nodes and the links forming the logical plan into a DAG-based distributed stream processing service by using an application programming interface (API) provided from a distributed processing system.

The distributed stream processing service managing module may distributively deploy tasks forming the distributed stream processing service in a plurality of nodes based on resource conditions of the cluster system.

The distributed stream processing service may include a relationship between external input/output tasks defining a task of receiving a data stream from an external source and providing the received data stream in units of window or a task of outputting a data stream to an external source and stream processing tasks defining a task of receiving and processing a data stream, expressed based on DAG.

The distributed stream processing service managing module may collect state information of nodes forming the cluster system and state information regarding a task of a distributed stream processing service processed in the nodes, and relocate the distributed stream processing service based on the state information.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
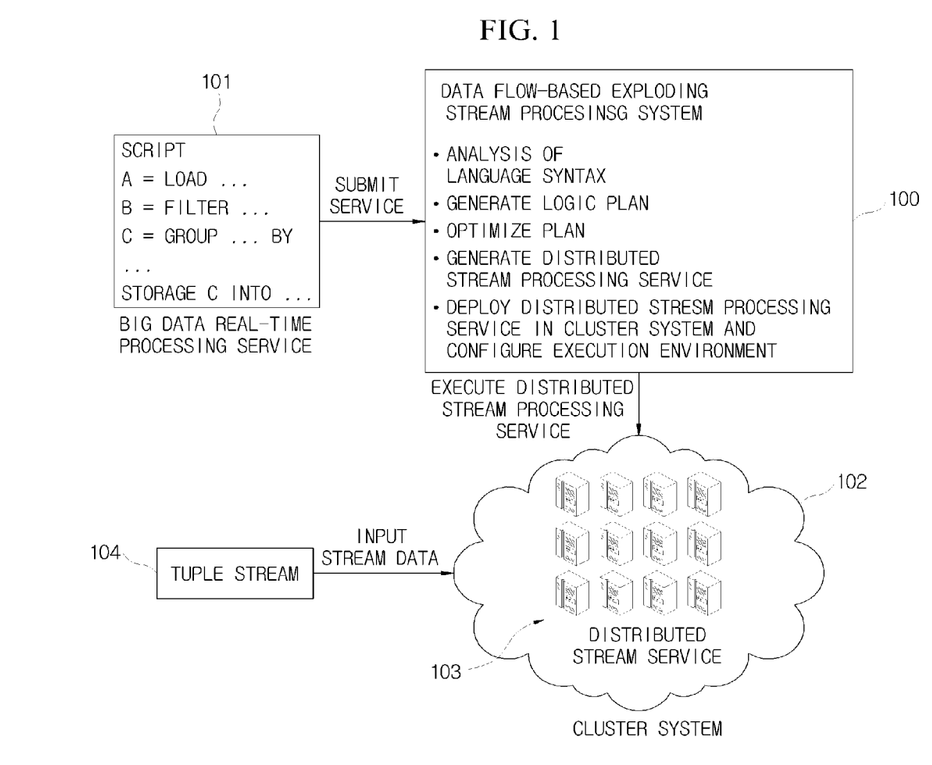
FIG. 1 is a view illustrating an environment in which a data flow-based exploding data stream processing system according to an embodiment of the present invention operates.

FIG. 1 is a view illustrating an environment in which a data flow-based exploding data stream processing system according to an embodiment of the present invention.

Referring to FIG. 1, a data flow-based exploding data stream processing system 100 according to an embodiment of the present invention operates based on a cluster system 102 including multiple nodes. The data flow-based exploding data stream processing system 100 receives a big data real-time processing service 101 described by a user in a real-time data flow language, analyzes a syntax thereof, generates a logical plan, and generates a distributed stream processing service 103.

Also, the data flow-based exploding data stream processing system 100 distributively deploys the generated distributed stream processing service 103 in the cluster system 102 including multiple nodes, and configures an execution environment of a task included in the distributed stream processing service 103. The distributed stream processing service 103 deployed in the multiple nodes constituting the cluster system 102 successively processes an input tuple data stream 104.

Figure 2:
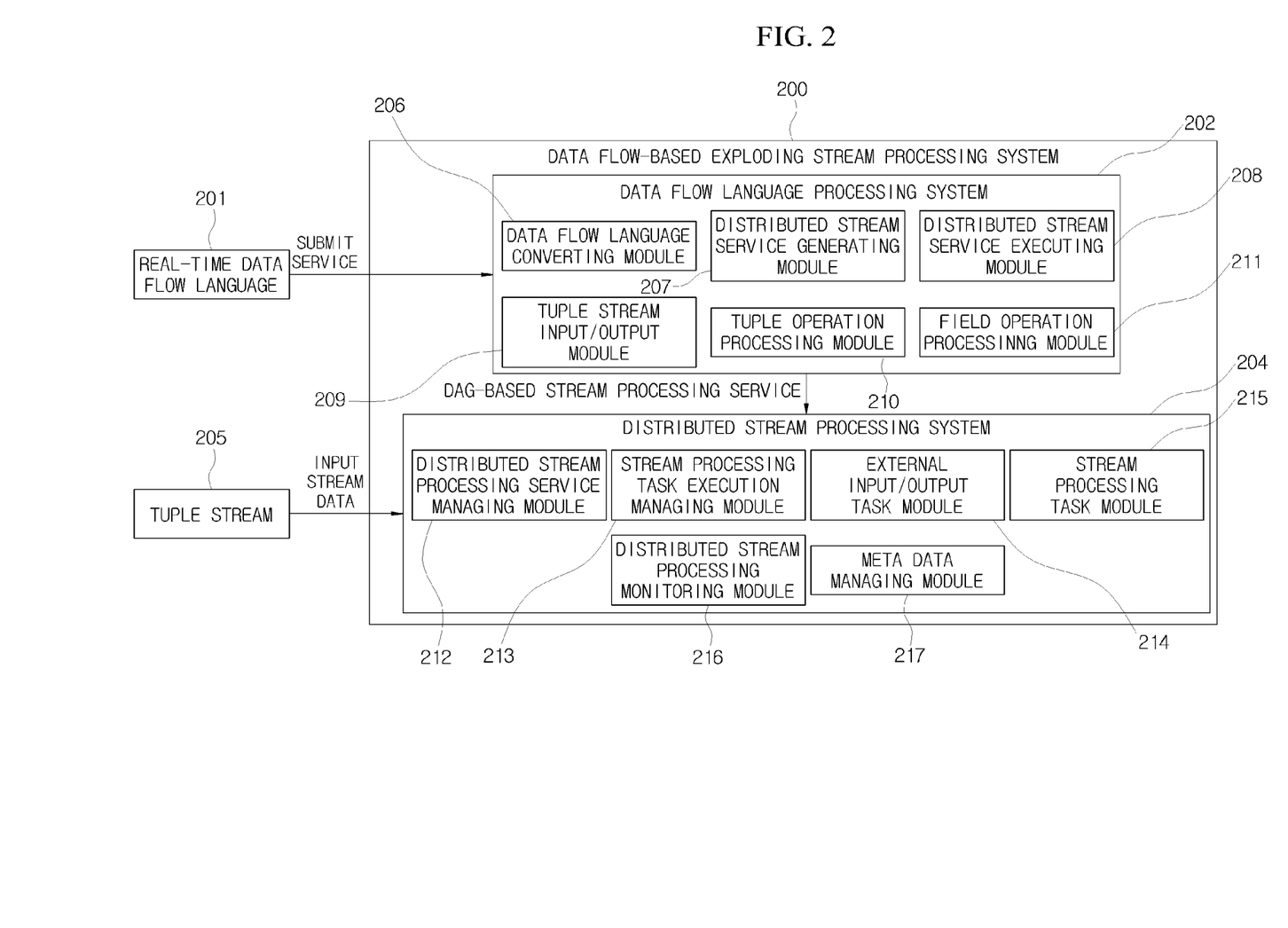
FIG. 2 is a view illustrating a configuration of a data flow-based exploding data stream processing system according to an embodiment of the present invention.

FIG. 2 is a view illustrating a configuration of a data flow-based exploding data stream processing system according to an embodiment of the present invention.

Referring to FIG. 2, a data flow-based exploding data stream processing system 200 according to an embodiment of the present invention includes a data flow language processing system 202 and a distributed stream processing system 204.

The data flow language processing system 202 interprets a big data real-time processing service described using a user-friendly extensible real-time data flow language 201 to convert it into a directed acyclic graph (DAG)-based stream processing service 203 through an internal converting module.

The distributed stream processing system 204 distributively deploys the converted DAG-based stream processing service 203 so as to be executable in multiple nodes, configures a continuous execution environment, and executes tasks constituting the DAG-based stream processing service 203. Continuously input stream data 205 is processed by the distributively deployed tasks in parallel.

Hereinafter, modules constituting the data flow-based exploding data stream processing system 200 will be described in detail.

A data flow language converting module 206 analyzes a real-time data flow language describing a big data real-time processing service to configure a logical plan. Here, the real-time data flow language includes basic operators providing processing with respect to a tuple and a tuple aggregation and field operators providing processing with respect to fields constituting tuples. The basic operators may be nodes of a logical plan, and a relationship between the operators is expressed as links of nodes, and the field operators may be dependent upon the basic operators so as to be configured in the logical plan.

A distributed stream service generating module 207 serves to optimize the logical plan configured by the data flow language converting module 206 and generate a DAG-based stream processing service executed in the distributed stream processing system 204 based on the optimized logical plan. In this case, the basic operator corresponding to a node of the optimized logical plan and the link representing a relationship between basic operators are converted into a DAG-based stream processing service by utilizing an application programming interface (API) provided in the distributed stream processing system 204. The DAG-based stream processing service expresses a relationship between an external input/output task and a stream processing task based on DAG.

Also, codes implemented for tuple stream input/output, tuple operation processing, and field operation processing are configured by utilizing functions provided from a tuple stream input/output module 209, a tuple operation processing module 210, and a field operation processing module 211.

A distributed stream service executing module 208 delivers the DAG-based stream processing service 203 generated by the distributed stream service generating module 207 to the distributed stream processing system 204 to execute the same.

A tuple stream input/output module 209 serves to convert a data stream received from an external source into a tuple-based data stream and extract the converted tuple-based data stream so that the data stream can be processed by the data flow-based exploding stream processing system 200. Also, the tuple stream input/output module 209 provides the result of the tuple-based data stream processing service in a form of stream to an external source. The data stream of the tuple stream input/output module 209 may be added as a user-defined type.

A tuple operation processing module 210 is a module handling processing operation with respect to a tuple-type data stream. The tuple operation processing module 210 processes a required operation according to functions of supported tuple operators (LOAD, STORE, FOREACH/GENERATE, FILTER, SORT, JOIN, or the like). The tuple operation processing module 210 may add a process operator as needed.

A field operation processing module 211 handle a required processing operation (comparison operation, arithmetic operation, and the like) depending on a data type (Int, Long, Float, Double, ByteArray, CharArray, and the like) forming a field value. The field operation processing module 211 may add a required process operation according to expansion of a data type such as movement, spatial data, and the like.

A distributed stream processing service managing module 212 serves to schedule the DAG-based stream processing service 203 based on resource conditions of the cluster system and distributively deploy the DAG-based stream processing service 203 in distributed nodes. The distributed stream processing service managing module 212 may also serve to redeploy the distributed stream processing service 203 in operation to the distributed nodes according to circumstances.

A stream processing task execution managing module 213 serves to configure and manage an environment for each node to execute a task.

An external input/output task module 214 serves to receive a stream from an external source and provides the received stream by window or output a stream to an external source.

A stream processing task module 215 serves to configure a task in an executable form by integrating relevant functions such that a stream processing task receives and processes a stream and deliver a processing result stream.

A distributed stream processing monitoring module 216 serves to collect state information of nodes and tasks and deliver the collected state information to the distributed stream processing service managing module 212. This is to provide information for redeploying a task to other nodes when a node has a fault or is overloaded.

The data flow-based exploding stream processing system 200 may support multiple services simultaneously, and in order to simultaneously support multiple services, a meta data managing module 217 for storing and managing information regarding each service, i.e., relevant information such as a name of a service, task information forming a service, and the like, is required.

Figure 3:
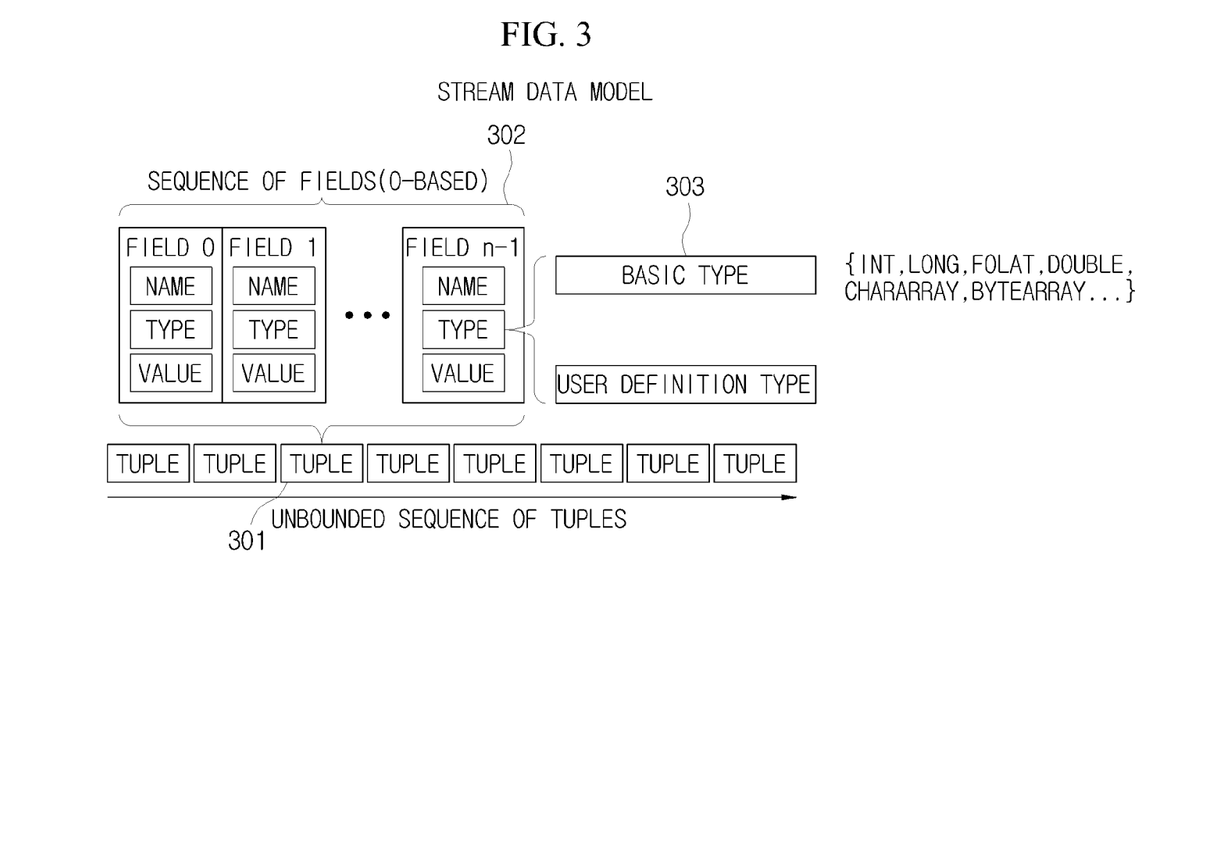
FIG. 3 is a view illustrating a tuple-based data stream model used in the data flow-based exploding data stream processing system according to an embodiment of the present invention.

FIG. 3 is a view illustrating a tuple-based data stream model used in the data flow-based exploding data stream processing system according to an embodiment of the present invention.

As illustrated in FIG. 3, a tuple-based data stream is defined as a flow of an unbounded tuple 301. Here, one tuple includes n fields 302, and each field includes a name, a data type, and a value. A data type 303 of a field includes a basic type supporting INT, LONG, FLOAT, DOUBLE, CHARARRAY, BYTEARRAY, BOOLEAN, and the like, and a user-defined type.

In order to process a tuple-based data stream, a real-time data flow language needs to express it to provide various stream input/output methods and a window function, and to this end, the real-time data flow language supports it by extending a value to be delivered to a basic operator or a function to be utilized as an implementation code of a basic operator, rather than extending a data flow language syntax.

A stream input/output method defines a method for inputting or outputting data as a tuple stream from an external source. Namely, the stream input/output method defines an input/output source type, a tuple unit input/output method, and the window function defines a unit to be processed in an input stream. Window types include a record window and a time window.

<Record Window>
RecordWindow size sliding
Size: Window size. Namely it denotes the number of windows
Sliding: Window sliding interval. It collects a record which has moved by a sliding size when a record is input
<Time Window>
TimeWindow size sliding
Size: Window size in units of time, i.e., a record input collected within a particular time
Sliding: Window sliding interval. It collects a record which has moved by a sliding size when a record is input Examples below show defining an input/output source type, an input/output method by tuple, and a window defining function by utilizing a value and a function to be delivered to a basic oeprator (LOAD), without expanding a syntax of a Pig Latin data flow language, in order to process a real-time data stream.

Figure 4:
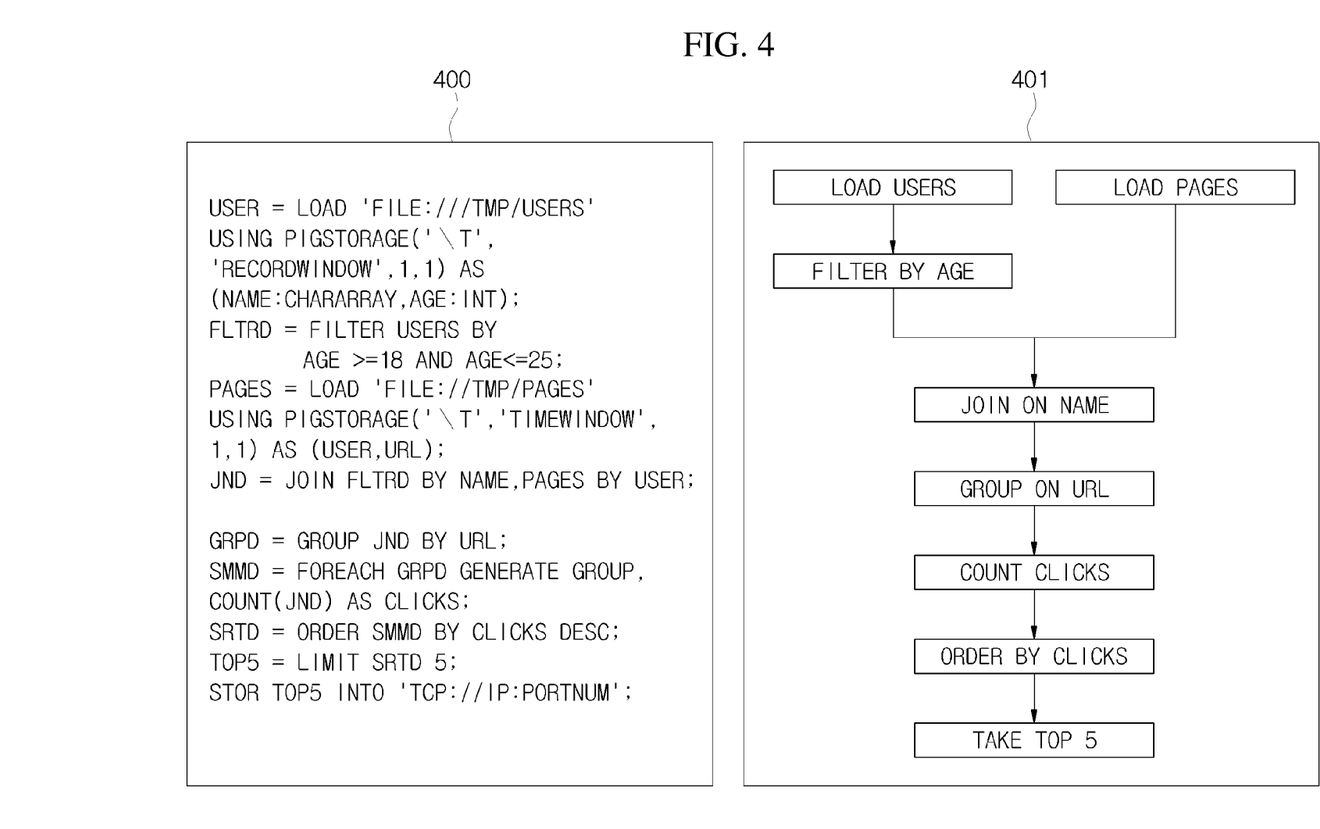
FIG. 4 is a view illustrating a big data processing service described in a real-time data flow language according to an embodiment of the present invention.

Input=LOAD 'file:///tmp/user' USING PigStorage('\t', 'RecordWindow', 1, 1) AS (name: chararray, age: int, gpa: float);

Input=LOAD 'tcp://IP:PortNum' USING PigStorage('\t', 'TimeWindow', 1, 1) AS (name: chararray, age: int, gpa: float);

FIG. 4 is a view illustrating a big data processing service described in the real-time data flow language according to an embodiment of the present invention. In FIG. 4, a diagram expressing a service syntax 400 described by a user in a real-time data flow language and a flow chart form 401 allowing the user to easily understand a data flow of the service syntax 400 is illustrated.

Figure 5:
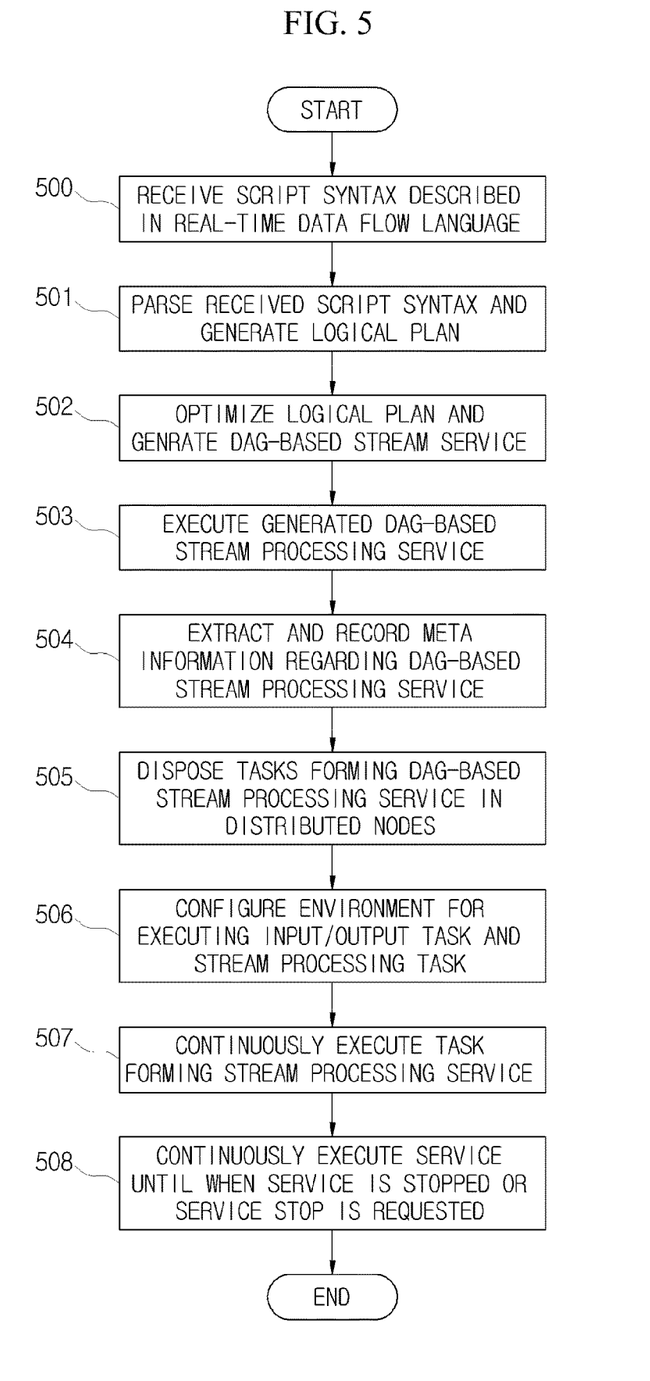
FIG. 5 is a view illustrating an operation of processing a data stream in the data flow-based exploding data stream processing system according to an embodiment of the present invention.

FIG. 5 is a view illustrating an operation of processing a data stream in the data flow-based exploding data stream processing system according to an embodiment of the present invention.

Referring to FIG. 5, the data flow-based exploding data stream processing system 200 receives a script syntax described in the real-time data flow language created to process a tuple-based data stream in step 500.

Next, the data flow-based exploding data stream processing system 200 parses the received script syntax created in the real-time data flow language to form a logical plan in step 501.

Thereafter, the data flow-based exploding data stream processing system 200 optimizes the generated logical plan and generates a DAG-based stream processing service operable in the distributed stream processing system in step 502.

Thereafter, the data flow-based exploding data stream processing system 200 requires execution of the generated DAB-based stream processing service in step S503. In this case, the data flow-based exploding data stream processing system 200 extracts and records meta information regarding the DAG-based stream processing service in step 504.

Thereafter, the data flow-based exploding data stream processing system 200 deploy an input/output task and a stream processing task forming the DAG-based stream processing service on distributed nodes in step 505.

Thereafter, the data flow-based exploding data stream processing system 200 configures an environment for executing the input/output task and the stream processing task deployed in each node in step 506.

Thereafter, the data flow-based exploding data stream processing system 200 continuously executes the tasks forming the stream processing service according to a data flow each time a data stream is input in step 507. The tasks forming the stream processing service are executed continuously until when a request for stopping the stream processing service or a temporary stop request for redeploying the stream processing service is received in step S508.

Figure 6:
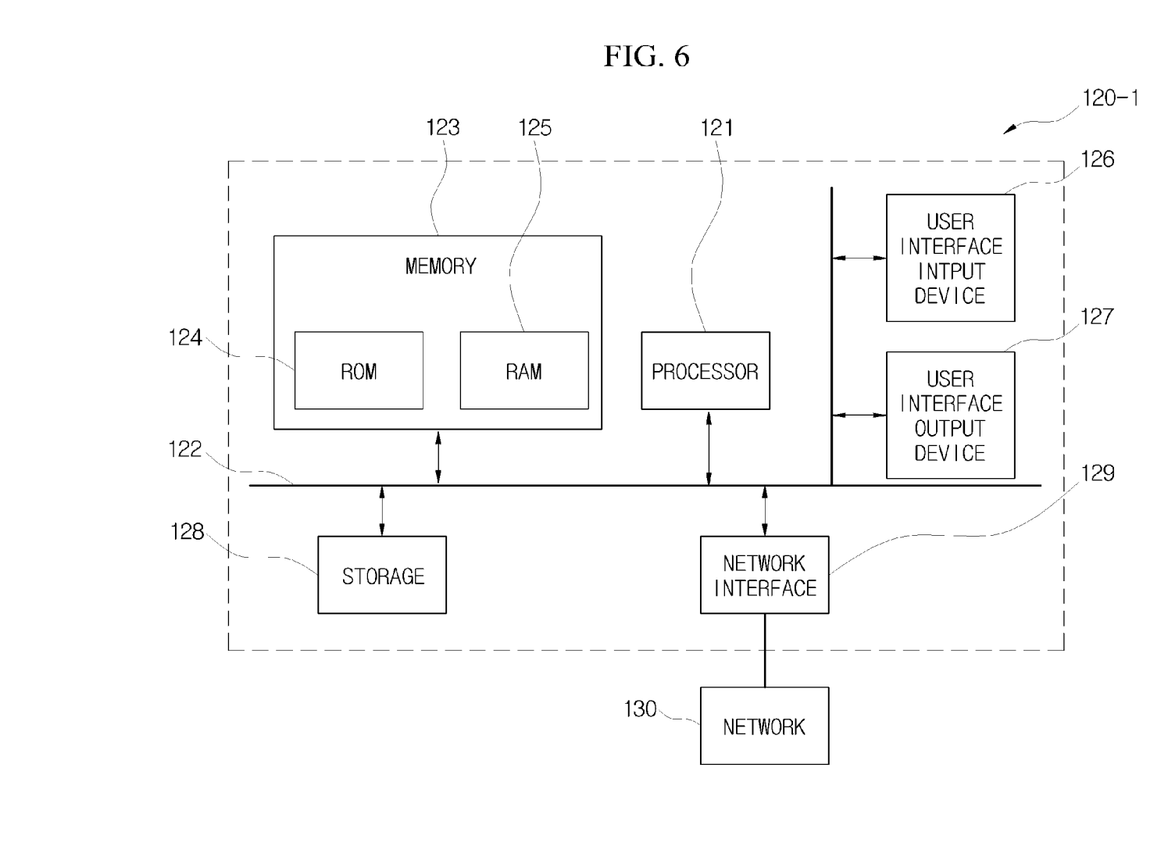
FIG. 6 is a view illustrating a configuration of a computer device in which a method for processing an exploding data stream based on a data flow according to an embodiment of the present invention is executable.

The data flow-based exploding data stream processing method according to an embodiment of the present invention may be implemented in a computer system or recorded in a recording medium. As illustrated in FIG. 6, the computer system may include one or more processors 121, a memory 123, a user interface input device 126, a data communication bus 122, a user interface output device 127, and a storage 128. The foregoing components perform data communication through the data communication bus 122.

The computer system may further include a network interface coupled to a network. The processor 121 may be a central processing unit (CPU) or a semiconductor device processing a command stored in the memory 123 and/or the storage 128.

The memory 123 and the storage 128 may include various types of volatile or nonvolatile storage mediums. For example, the memory 123 may include a ROM 124 and a RAM 125.

Thus, the data flow-based exploding data stream processing method according to an embodiment of the present invention may be implemented as a computer-executable method. When the data flow-based exploding data stream processing method according to an embodiment of the present invention is executed in a computer device, computer-readable commands may perform an aligning method according to an embodiment of the present invention.

According to an embodiment of the present invention, since a high level of data flow language is provided, development of a data stream processing service can be facilitated, and a highly expandable stream processing service environment flexibly adaptable to a change in an amount of data stream and a change in workload of a stream processing service.

The data flow-based exploding data stream processing method according to the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computer-executable method for data flow-based exploding data stream processing in a cluster system including multiple nodes, the method comprising:
    receiving a service script described in a real-time data flow language for processing a tuple-based data stream, the real-time data flow language including
        a plurality of basic operators defining processing of a tuple and a tuple aggregation, and
        a plurality of field operators defining processing of fields forming the tuple,
    the service script including instructions corresponding to
        a type of an input/output source,
        a tuple unit input/output method, and
        a window function defining a unit to be processed in the data stream,
    by using the basic operators or by delivering a value to one of the basic operators;
    interpreting the service script to configure a logical plan, which includes a plurality of logical nodes corresponding respectively to the plurality of basic operators;
    optimizing the logical plan to generate a directed acyclic graph (DAG)-based distributed stream processing service;
    distributively deploying the distributed stream processing service in the cluster system and configuring an execution environment for executing the distributed stream processing service in each of the multiple nodes; and collecting state information of the nodes forming the cluster system and state information regarding a task of the distributed stream processing service processed in the nodes; and redeploying the distributed stream processing service based on the state information.

2. The method of claim 1, wherein the configuring of a logical plan further comprises expressing relationships between the basic operators as links of the logical nodes, and setting the field operators to a relationship in which the field operators are dependent upon the basic operators.

3. The method of claim 2, wherein the converting into a DAG-based distributed stream processing service comprises converting the logical nodes and the links forming the logical plan into the DAG-based distributed stream processing service by using an application programming interface (API) provided from a distributed processing system.

4. The method of claim 1, wherein the configuring of an execution environment comprises distributively deploying tasks forming the distributed stream processing service in the multiple nodes based on resource conditions of the cluster system.

5. The method of claim 4, wherein the distributed stream processing service is a service in which a relationship between external input/output tasks defining a task of receiving a data stream from an external source and providing the received data stream in units of window or a task of outputting a data stream to an external source and stream processing tasks defining a task of receiving and processing a data stream is expressed based on DAG.

6. A data flow-based exploding data stream processing system, comprising:

a hardware processor, and a non-transitory medium having program instructions stored thereon, execution of which by the hardware processor causes the processing system to provide functions of:

a data flow language converting module configured to interpret a service script described in a real-time data flow language, the real-time data flow language including a plurality of basic operators defining processing of a tuple and a tuple aggregation, and a plurality of field operators defining processing of fields forming the tuple, the service script including instructions corresponding to a type of an input/output source, a tuple unit input/output method, and a window function defining a unit to be processed in the data stream, by using the basic operators or by delivering a value to one of the basic operators; and configure a logical plan that includes a plurality of logical nodes corresponding respectively to the plurality of basic operators;

a distributed stream service generating module configured to optimize the logical plan and convert the optimized logical plan into a directed acrylic graph (DAG)-based distributed stream processing service; and a distributed stream processing service managing module configured to distributively deploy the distributed stream processing service in a cluster system including multiple nodes and configure an execution environment for executing the distributed stream processing service in each of the multiple nodes, the distributed stream processing service managing module collecting state information of the nodes forming the cluster system and state information regarding a task of the distributed stream processing service processed in the nodes, and redeploying the distributed stream processing service based on the state information.

7. The system of claim 6, wherein the data flow language converting module further expresses relationships between the basic operators as links of the logical nodes, and sets the field operators to a relationship in which the field operators are dependent upon the basic operators.

8. The system of claim 7, wherein the distributed stream service generating module converts the logical nodes and the links forming the logical plan into the DAG-based distributed stream processing service by using an application programming interface (API) provided from a distributed processing system.

9. The system of claim 6, wherein the distributed stream processing service managing module distributively deploys tasks forming the distributed stream processing service in the multiple nodes based on resource conditions of the cluster system.

10. The system of claim 6, wherein the distributed stream processing service is a service in which a relationship between external input/output tasks defining a task of receiving a data stream from an external source and providing the received data stream in units of window or a task of outputting a data stream to an external source and stream processing tasks defining a task of receiving and processing a data stream is expressed based on DAG.

* * * * *